United States Patent [19]

Fauth et al.

[11] Patent Number: 4,752,384
[45] Date of Patent: Jun. 21, 1988

[54] METHOD FOR RECYCLING CANS

[75] Inventors: Donald A. Fauth, Chesterfield County; Michael A. Glagola, Goochland County; John F. Krzyston, Chesterfield County; George F. Swenck, Henrico County, all of Va.

[73] Assignee: Reynolds Metals Company, Richmond, Va.

[21] Appl. No.: 672,157

[22] Filed: Nov. 16, 1984

Related U.S. Application Data

[63] Continuation of Ser. No. 459,827, Jan. 21, 1983, abandoned.

[51] Int. Cl.⁴ .............................................. B03C 1/02
[52] U.S. Cl. ................................. 209/212; 198/457; 209/225; 209/645
[58] Field of Search ................... 209/212–216, 209/38, 223 A, 225–227, 636, 691, 693, 645, 646; 198/457, 461, 567

[56] References Cited

U.S. PATENT DOCUMENTS

| Re. 27,643 | 5/1973 | Myers | 194/4 C |
|---|---|---|---|
| 3,083,809 | 4/1963 | Fischer | 198/457 X |
| 3,111,484 | 11/1963 | Cavanagh | 209/227 |
| 3,749,240 | 7/1973 | Spears et al. | 209/636 |
| 3,837,469 | 9/1974 | Kihnke | 198/461 X |
| 3,907,087 | 9/1975 | Tanaka | 194/4 C |
| 4,062,767 | 12/1977 | Rudy | 209/212 |
| 4,106,627 | 8/1978 | Watanabe et al. | 209/212 X |
| 4,137,156 | 1/1979 | Morey et al. | 209/227 X |
| 4,141,493 | 2/1979 | Arp | 235/448 |
| 4,179,018 | 12/1979 | Miller | 194/4 R |
| 4,207,973 | 6/1980 | Stampleman | 194/4 F |
| 4,241,821 | 12/1980 | Wu et al. | 194/4 C |
| 4,324,325 | 4/1982 | Dowealtron | 194/4 C |

Primary Examiner—Robert B. Reeves
Assistant Examiner—Donald T. Hajec
Attorney, Agent, or Firm—Alan T. McDonald

[57] ABSTRACT

A method and apparatus for recycling cans is disclosed. Discrimination of overweight conductive material from acceptable conductive materials from a mixed material input, while maintaining a high level of acceptable material recovery is achieved by control of the input to the separation system, as well as control of the separation mechanism.

7 Claims, 9 Drawing Sheets

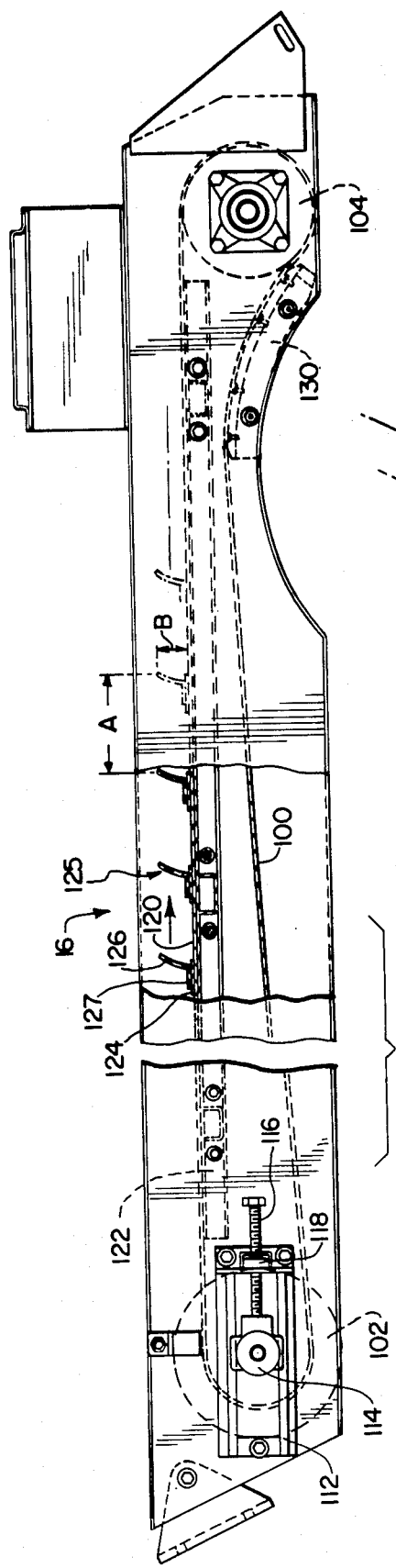
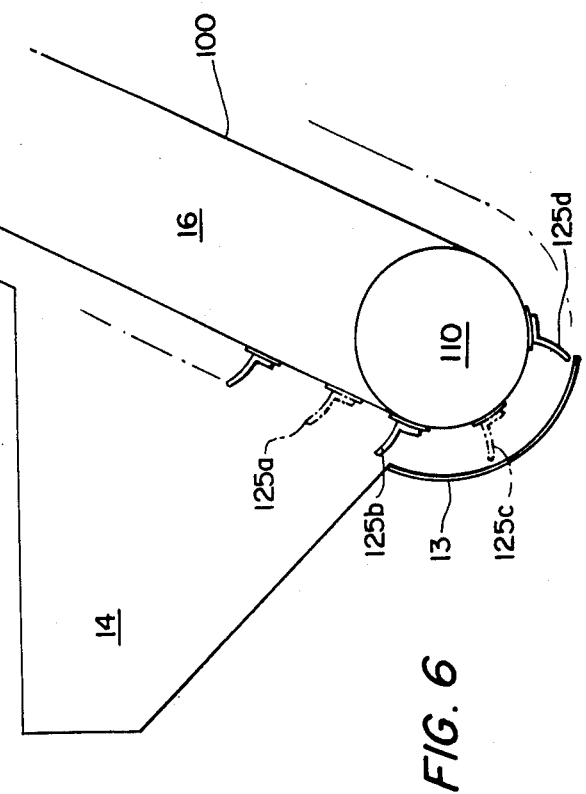
FIG. 5
FIG. 6

METHOD FOR RECYCLING CANS

This application is a continuation of application Ser. No. 459,827, filed Jan. 21, 1983 now abandoned.

BACKGROUND OF THE INVENTION

Recycling of used products for reclamation of raw materials has become a way of life. Specifically, recycling of aluminum cans for reclamation of the aluminum is now commonplace.

Typically, a consumer saves a plurality of containers and brings these containers to a mobile or permanent recycling facility, where the containers are turned over to an employee of the recycling company who weighs or counts the containers and pays the consumer for the containers at a prestated rate. Unfortunately, such a system is labor intensive, requiring at least one operator to be at each facility whenever it is open.

One possible solution to the labor problem is to replace many of the manned stations with automated facilities. This, however, results in other problems.

If the ideal were reached, i.e., a customer places only aluminum cans into such a "reverse vending" machine, such a machine would be simple. All that would be necessary would be a means for weighing or counting the cans, a payout apparatus linked to the weighing or counting means and a means for storing the cans collected. However, such an ideal is never realized.

First, all beverage containers are not aluminum. Thus, a reverse vending machine must be capable of distinguishing steel from aluminum, so that no payment is made for steel cans.

While the placing of steel cans in a reverse vending machine designed to accept aluminum cans could be inadvertent on the part of the consumer, other deliberate acts must also be overcome by such a machine. It is not unknown for unscrupulous consumers to place bottles, rocks, sticks and other debris into reverse vending machines. Thus, the machine must be able to separate aluminum cans from this debris, handle the debris without damage to the machine and pay only for the aluminum cans. Additionally, other consumers, looking to cheat the machine, will place sand, rocks, water, and other materials into aluminum cans, hoping to be paid for the weight of the filled can. Or, a customer, not knowing the damage that a relatively large solid block of aluminum can do to a can crusher, may place portions of aluminum engine blocks, baseball bats and other massive aluminum materials into the reverse vending machine. Thus, in order to protect itself, as well as to avoid payment for weighted cans, the machine must be capable of discriminating between aluminum bodies based upon their weight.

Several means are known in the prior art for collecting aluminum containers. U.S. Pat. No. 4,179,018 uses air and magnetics as a means of isolating aluminum cans from mixed trash. U.S. Pat. No. 4,062,767 uses a linear induction motor (LIM) to accomplish this result. Yet, each of these systems has shortcomings associated therewith. Thus, the air classification system has trouble discriminating between various weights and shapes of cans, sometimes paying for somewhat overweight cans and sometimes not paying for acceptable material. The known LIM systems do not significantly control the mixed trash input to the linear induction motor so that proper control of overweight materials, as well as complete collection of properly weighted cans, is accomplished.

Another deficiency in many of the known reverse vending machines is the necessity, due to the layout and material flow of these machines, for a separate storage for steel cans which are inadvertently collected by the system. Since this storage area is typically small with respect to the storage area for aluminum cans, and since overflow of this small area requires frequent servicing of the machine, such a system either significantly increases servicing costs or significantly increases the size of the machine to provide adequate steel can storage.

Other problems which may arise in the operation of a reverse vending machine include overloading of a can crusher due to a high density of flattened cans or axially crushed cans, commonly known as "hockey pucks", and conveying mechanisms for the input to the machine being incapable of accepting the very last portions of input to the system.

It is thus a primary objective of the present invention to provide a reverse vending machine which is capable of discriminating between various weights of aluminum products received, such that overweight materials are not paid for and assure that acceptable materials are reliably paid for. It is also an objective of the present invention to eliminate the necessity for a separate steel storage facility. It is also a primary objective of the present invention to provide a reverse vending machine which includes means for preventing overloading of crushing means within the mechanism when high density aluminum is received. It is also a primary objective of the present invention to provide apparatus for insuring that all material received by the mechanism is processed by the system.

THE PRESENT INVENTION

By means of the present invention, these desired objectives are obtained.

The reverse vending machine of the present invention includes a method and apparatus for discriminating between acceptable weight aluminum cans and other materials. This includes controlling discharge from an input conveyor belt such that a single layer of aluminum cans and accompanying materials results at the output position of said belt at a given time, magnetically separating steel and other magnetic materials from the material input at the discharge of the input conveyor belt, positioning a conveyor to accept the discharge from the input conveyor belt, positioning a linear induction motor under the conveying surface of the output conveyor, controlling the speeds of the input and output conveyors such that the entire material from a given discharge position of the input conveyor has passed the discharge position of the input conveyor prior to entry of the next material onto the output conveyor, and controlling the speed of the output conveyor and the electromotive force supplied by the linear induction motor to permit only aluminum materials within a given weight range to be transported from the output conveyor by the linear induction motor.

The method and apparatus of the present invention further includes controlling of input to a can crusher forming a part of the system by controlling output from a weigh hopper feeding the crusher. This control comprises controlled opening and closing of a door positioned as the bottom floor of the weigh hopper in a controlled speed manner such that the crusher does not receive an overabundance of cans at one time.

The method and apparatus of the present invention also includes recombining of the steel cans collected with stored aluminum cans prior to and/or after weighing of the aluminum cans and prior to and/or during crushing of the aluminum and steel cans. This is accomplished by directly feeding the steel cans removed by the input conveyor to the can crusher, bypassing the weigh hopper. This results in both the aluminum and steel cans being transported to a single storage facility within the reverse vending machine, eliminating the necessity for a separate steel collection capability.

The method and apparatus of the present invention also includes an input hopper, input conveyor and input conveyor baffle mechanism which assures that all materials fed to the system by the customer will be conveyed by the input conveyor. This is accomplished by means of a shield located beneath the input conveyor and positioned such that cleats on the conveyor pull material from between the shield and the conveyor and through the system.

BRIEF DESCRIPTION OF THE DRAWINGS

The method and apparatus of the present invention will be more fully described with reference to the drawings in which:

FIG. 5 is a side elevational view, partially broken, of the input conveyor mechanism;

FIG. 6 is a partial side elevational view of the input hopper and input conveyor mechanism, with the side panels thereof removed;

DETAILED DESCRIPTION OF THE PREFERRED EMBODIMENTS

Figure 1:
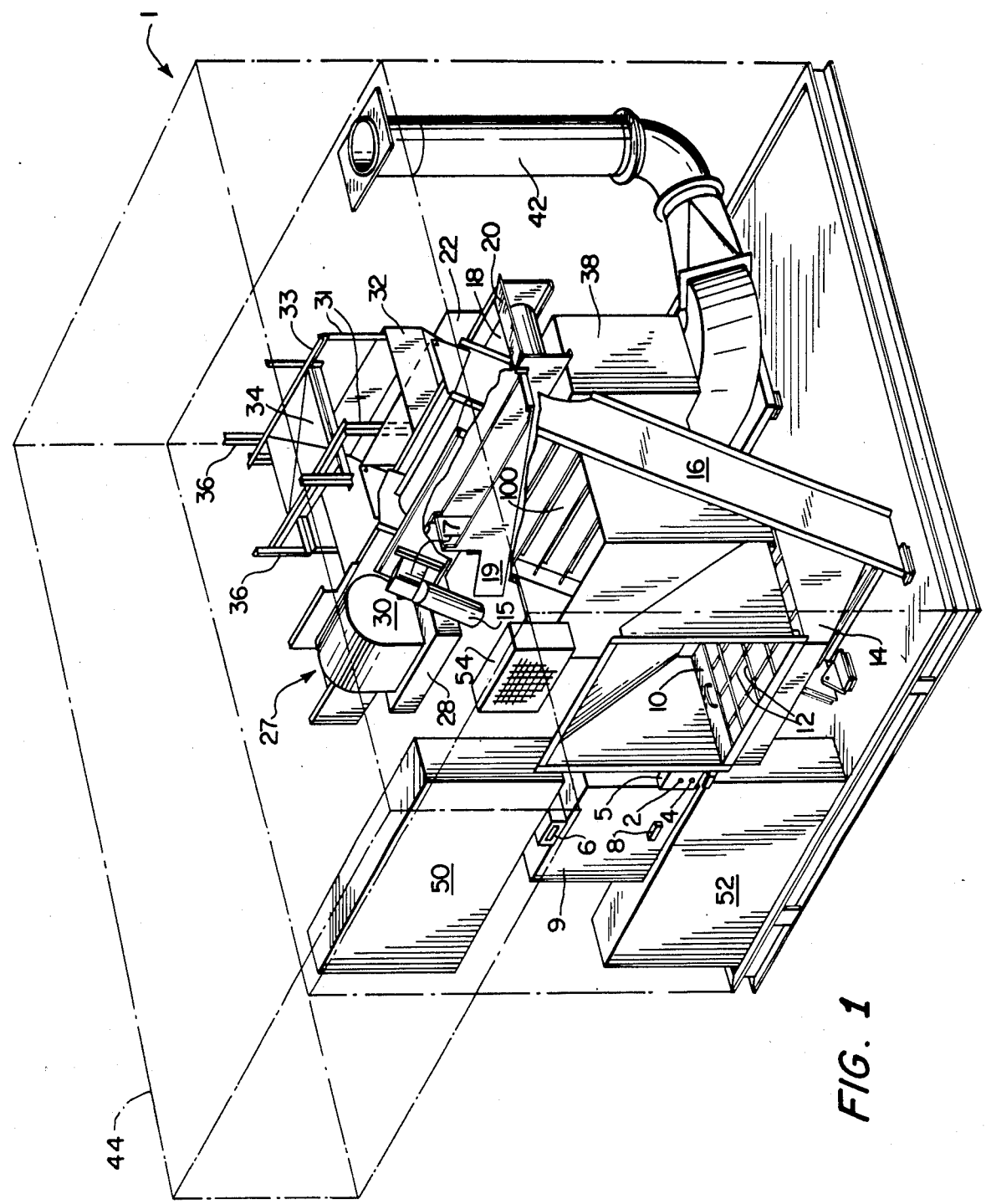
FIG. 1 is a perspective view of the reverse vending machine of the present invention, with the outer walls thereof in phantom.
Figure 2:
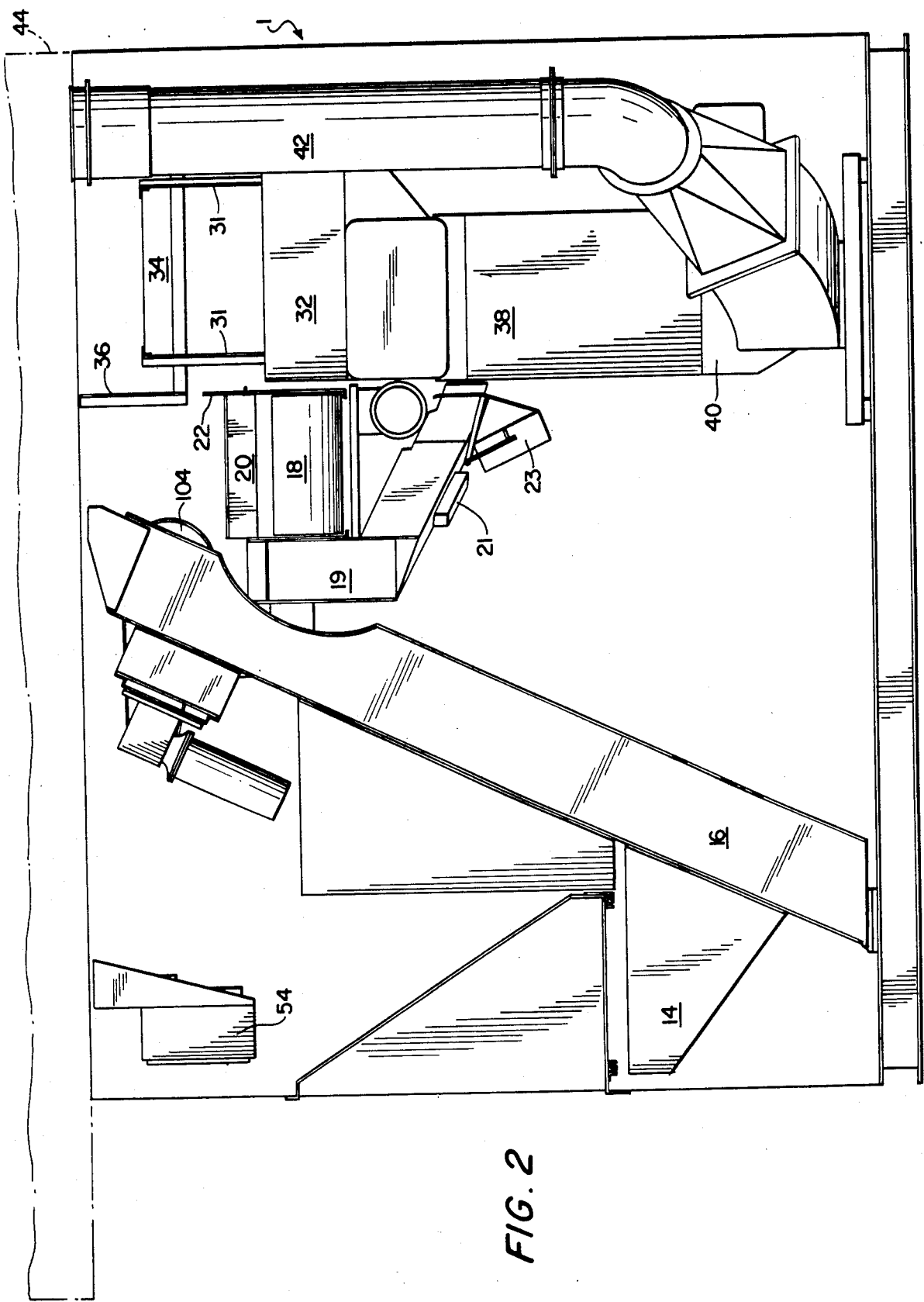
FIG. 2 is a right side view with the outer walls in phantom.
Figure 3:
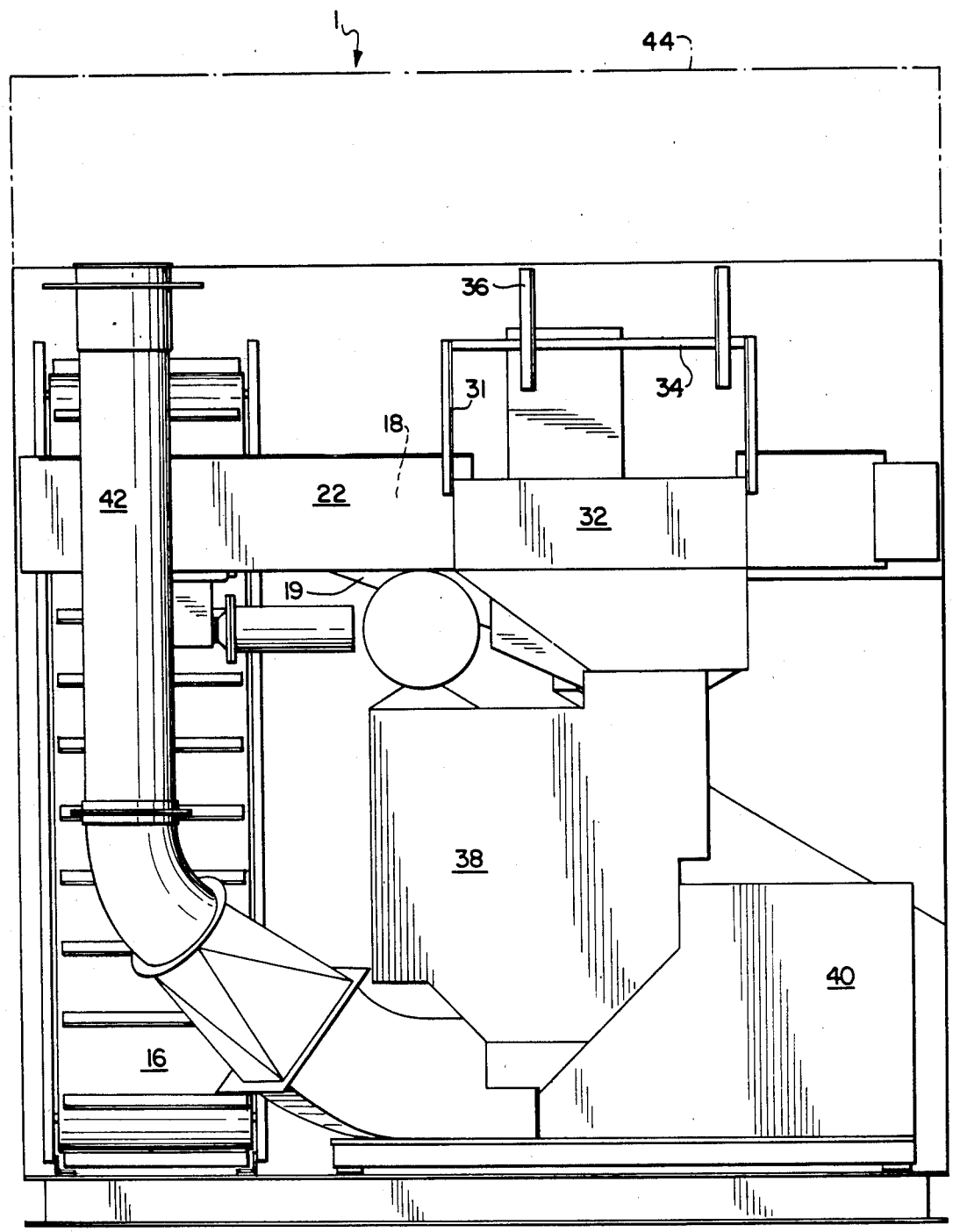
FIG. 3 is a back view with the outer walls in phantom.
Figure 4:
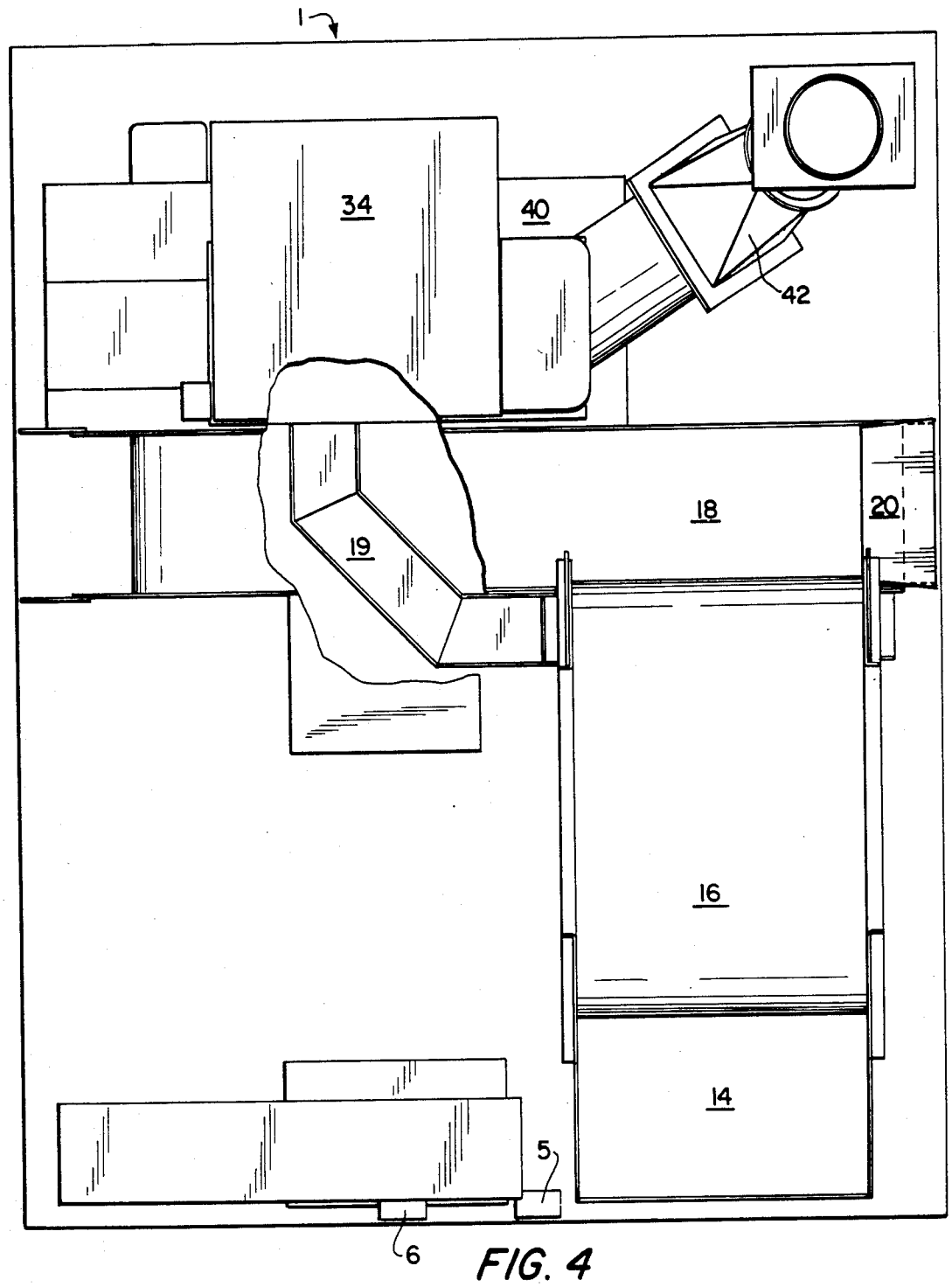
FIG. 4 is a top view with the storage bin removed.

Turning now to the FIGURES, and especially FIGS. 1 through 4, the passage of material through the reverse vending machine of the present invention will be described. Upon arrival at the reverse vending machine 1, a customer opens door 10 by sliding it from its closed position to its open position, as illustrated. The customer then dumps the material to be handled by the machine 1 into entry hopper 14. Entry hopper 14 is protected by shield 12, which is a grid formed from rods, bars and the like. This shield 12 protects the machine 1 from inordinately large materials, such as castings, extrusions, or the like. Clearly, however, the shield 12 cannot protect the machine 1 from every foreign object which may be fed to the system. Thus, other protective mechanisms will be described below.

After filling hopper 14 to its capacity, or having run out of material to feed to the machine 1, the customer closes door 10 and pushes start button 2, beginning operation of the machine 1. A signal light 4 may indicate beginning of operation of the system 1. Start button 2 and signal light 4 are held within panel 5. An alphanumeric display box 6 may update the customer as to the status of the operation throughout the processing. Thus, this box 6, which is microprocessor controlled, as is the entire system, may indicate that the machine is ready for operation, is out of service, is processing the material, and may indicate the amount of payout to be made.

The material for processing is transferred from input hopper 14 by means of input conveyor 16. A more detailed description of this operation will be described below, with reference to FIGS. 5 and 6. Shield 13 (FIG. 6) captures any material which may fall back from conveyor 16, so that this material is again caught up by the conveyor 16 for processing. At the discharge end of conveyor 16, a magnetic head pulley 104 captures all magnetic materials, such as steel cans, and other ferromagnetic materials, causing these materials to be held onto belt 100 until belt 100 passes from magnetic head pulley 104. This causes any magnetic materials to fall into chute 19, where they are carried along chute 19 and pass over a spring-mounted door 21. Spring-mounted door 21 is adjusted such that steel materials weighing somewhat more than steel cans will trip the door, thus causing these materials to fall into a receptacle. The balance of steel materials are then held by gate mechanism 23 until a signal is given to open gate mechanism 23 and permit these materials to pass into crusher 38. It should be noted that gate mechanism 23 may be eliminated, with the steel materials not passing through door 21 then passing directly to crusher 38.

Non-magnetic materials exit belt 100 onto conveyor 18. These materials are carried by conveyor belt 198 over a linear induction motor mechanism 27, including a blower 30 for cooling and an enclosure 28 within which a linear induction motor 220 is mounted. Baffles 20 and 22 are positioned at the beginning of conveyor 18, to prevent materials exiting conveyor belt 100 from falling from the system. Further, belt 198 is unsupported along its length corresponding to the width of conveyor 16. This also aids in preventing materials from bouncing off of conveyor 18.

As the material passes over linear induction motor 220, conductive materials, such as aluminum cans, will be deflected by the linear induction motor 220 into a weigh hopper 32. Non-conductive materials, such as paper, sticks and the like, as well as overweight conductive materials, for reasons to be explained below, are not deflected by linear induction motor 220 and pass off the end of conveyor 18 to be collected as waste.

Once all material has existed conveyor 18, the weight of hopper 32 and its contents is determined. Hopper 32 is mounted by means of rails 31 and cross rails 33 to a scale mechanism 34, which is in turn hung from the ceiling of the machine 1 by means of rails 36. The weight of the material within hopper 32 is determined, with this signal being relayed to a microprocessor controlled coin vault 9, where the consumer is paid based on a pre-determined amount per unit weight through pay out slot 8 with the amount being displayed on alphanumeric display box 6.

The cans in weigh hopper 32 are then permitted to enter can crusher 38, by opening a bottom door on weigh hopper 32, in a manner which will be more fully described below with respect to FIGS. 8, 9 and 10, the cans are crushed, and conveyed by means of blower 40 through chute 42 into storage bin 44. As will readily be realized, both steel cans from chute 19 and aluminum cans from weigh scale 32 are combined during the crushing, blowing and storage operations.

This is in contrast to prior systems, where steel materials were separated and held separately. In the prior systems, storage facilities were necessary for the steel materials, and, due to the nature of such systems, this storage was small relative to that for aluminum cans. Unfortunately, the small steel storage necessitated service at more frequent intervals than would be desired.

Cans collected by reverse vending machines are normally transported to a permanent recycling facility. At such facilities, magnetic separators are routinely employed to separate steel from aluminum, in the same way they are separated for customers bringing cans directly to the center. Thus, isolation of steel at the reverse vending machine is unnecessary. The reverse vending machine 1 of the present invention recombines steel and aluminum cans in a single storage bin 44 on top of the reverse vending machine 1, after having previously separated these materials for weighing of the aluminum cans.

As previously mentioned, the reverse vending machine 1 is microprocessor controlled. The various wiring and circuitry necessary to operate the system are contained within cabinets 50 and 52 and are conventional to those of ordinary skill in the microprocessor field. An air conditioner 54 is provided for cooling of the components.

Thus far, the general operation of the reverse vending machine 1 has been described. A detailed consideration of various components is necessary, however, in order to fully appreciate the interrelations and optimizations present in the reverse vending machine 1 of the present invention.

FIGS. 5 and 6 illustrate the input conveyor assembly of the present invention. In FIG. 6, the input hopper 14 into which the customer places the material to be recycled, as previously described, is positioned adjacent to input conveyor 16 having a conveyor belt surface 100 and a plurality of cleats 125 extending therefrom. A baffle or shield 13 is positioned at the bottom of hopper 14. This baffle 13 is concentric with pulley 110 around which belt 100 passes and comprises an arc having a length at least equal to the spacing between adjacent cleats 125. When looking at FIG. 6, the necessity for the baffle 13 becomes evident. As the belt 100 is advanced, a cleat 125 proceeds from its initial position 125b illustrated in solid lines, which prohibits material in hopper 14 from advancing beyond cleat 125b, to its dotted line position 125a, which opens the bottom of hopper 14. As this occurs, another cleat 125 advances from its initial position 125d in solid lines to its dotted line position 125c, sweeping material passing through the bottom of hopper 14 and advancing this material for recovery.

Thus, it is clear that baffle 13 must have an arc length at least equal to the distance between adjacent cleats 125, to assure that no material may pass out of the system at this point. Of course, the length of baffle 136 may be somewhat longer than the minimum required.

This hopper-baffle-conveyor cleat arrangement replaces previously known mechanisms which comprise a one-way door located at the bottom of an input hopper, permitting belt cleats to rise, but prohibiting material from passing downwardly through the door. Such a mechanism has been found inadequate with steeply inclining input conveyors, since the door pushes back material toward the hopper and, it has been found that the last-remaining material in the hopper was not always capable of being captured by the conveyor mechanism 16, as it was consistently pushed back into hopper 14 by the door.

As previously mentioned, the necessity for the baffle mechanism was due to the requirement of a steeply inclined input conveyor 16. This conveyor 16 may be positioned at an angle from about 55 to 75°, and preferably at an angle of about 65°. This steep angle helps to assure that a single level of material is carried by the cleats 125 of conveyor 16, rather than having a plurality of cans piled upon one another, which could result from a shallow conveyor inclination, and which in the past has required belts, chains or other dragging mechanism to level the load on input conveyor 16.

FIG. 5 more clearly illustrates the details of the input conveyor 16. The conveyor 16 comprises a belt 100 having a plurality of cleats 125 along the length thereof. Belt 100 is positioned between a pair of pulleys 102 and 104. Pulley 102 is adjustable by means of bracket 112, slide 114 attached to pulley 102 and positioned within bracket 112 and locking bolt 116 and locking nut 118. Pulley 104 is a magnetic head pulley which maintains magnetic materials on belt 100 as they pass around pulley 104, to be dropped off into chute 19 (FIG. 1). Conveyor mechanism 16 is driven by means of motor 15 and gear box 17 (FIG. 1) and belts or chains (not shown) connecting gear box 17 to pulley 104. Guide 130, which deflects belt 100 out of its normal path between pulleys 104 and 102, helps position the magnetic materials for entry into chute 19. This direction of magnetic materials to chute 19 may, of course, be accomplished by other means.

Belt 100 is preferably formed from a fabric or rubberized surface 120 and rides over a slider bed 122. Cleats 125, comprising a base 127 and an outstanding foot 126 formed as a single piece, are attached to the fabric or rubberized surface 120 through an intermediary steel backing 124. Alternatively, cleats 125 could be formed integrally with belt 100.

An important element of the conveyor 16 is the spacing of the cleats 125. The cleats 125 are spaced a distance A between one another, with this distance A being selected to permit a single row of metallic cans to be carried lengthwise between adjacent cleats 125. This length may range from about 6 to about 8 inches (15.24 to 20.32 centimeters) and is preferably about 7 inches (17.78 centimeters). If the length A becomes too short, containers may be pinched between adjacent cleats 125 as they pass over pulley 104, and thus fed to chute 19 or dropped onto the floor of the machine 1, rather than onto conveyor 18. On the other hand, if the spacing A between adjacent cleats 125 is too large, an over supply of material for processing from each cleat 125 may result on belt 18, reducing the effectiveness of the material discrimination system.

The height B of the cleats 125 is also carefully selected. This height may range from about 1.5 to about 3.0 inches (3.81 to 7.62 centimeters) and is preferably about 2.0 inches (5.08 centimeters), so that metallic containers may be carried on their sidewalls by the conveyor 16, but without the containers being stacked upon one another vertically outwardly from the belt surface 100.

Figure 7:
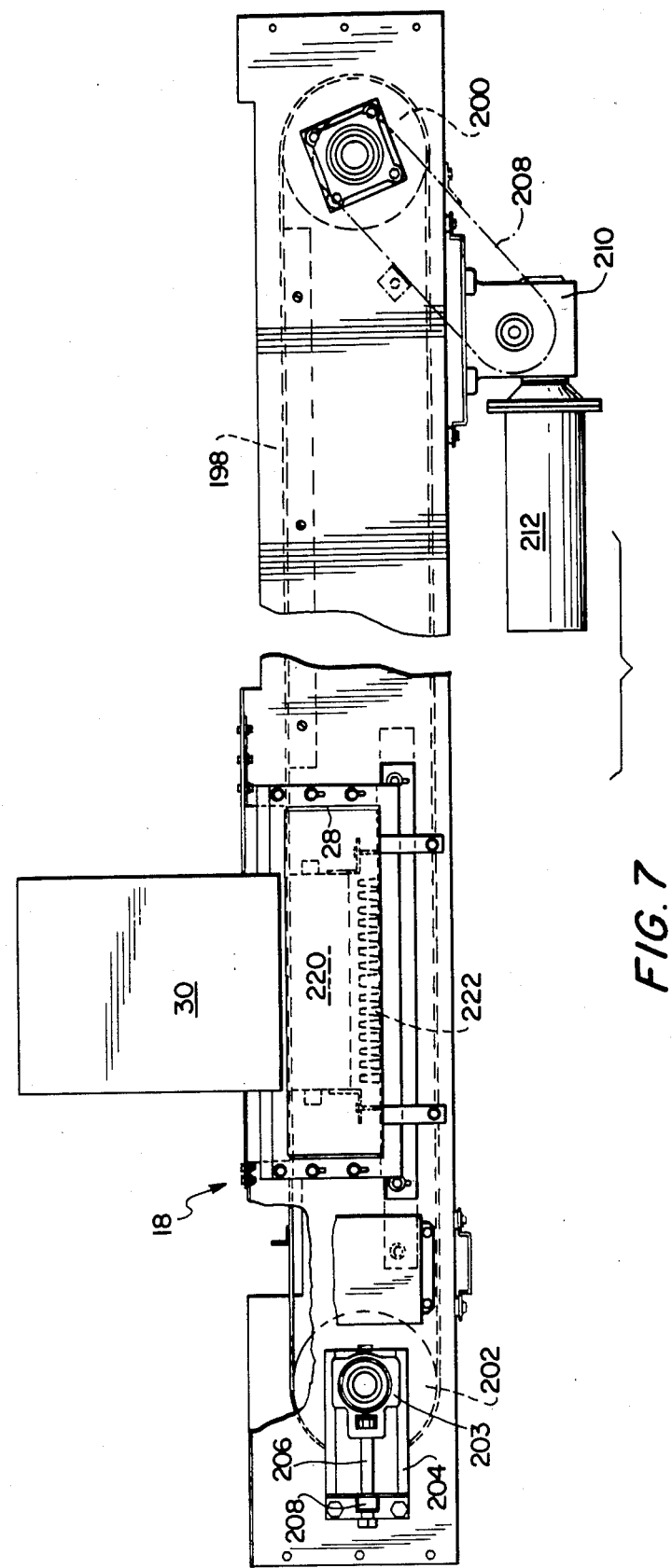
FIG. 7 is a side elevational view illustrating the linear induction motor and its associated conveying mechanism.

FIG. 7 illustrates the LIM separator mechanism employed in the present invention. A conveyor belt 18 is positioned between a pair of pulleys 200 and 202. Pulley 200 is driven by means of motor 212, gear box 210 and belt or chain 208. The tauntness of belt 18 is adjusted by means of bracket 204, slide 203 and bolt 206 and nut 208, similar to the adjustments previously described for conveyor 16.

Belt 18 is unsupported along its length, except at its position above linear induction motor housing 28. Housing 28 contacts the belt 18, supporting belt 18 and the materials thereon as the belt 18 passes thereover.

Figure 11:
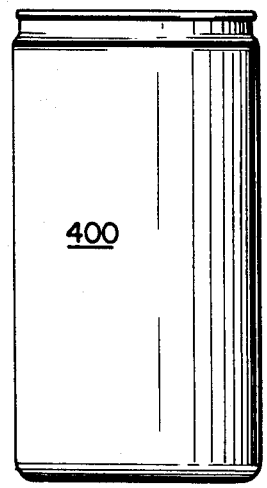
FIG. 11 is a side elevational view of a typical uncrushed beverage can.
Figure 12:
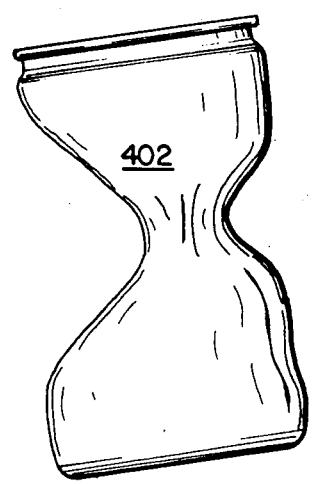
FIG. 12 is a side elevational view of a partically crushed beverage can.
Figure 13:
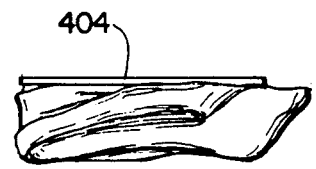
FIG. 13 is a side elevational view of a axially crushed can or "hockey puck".

Contained within housing 28 is a linear induction motor 220. This linear induction motor 220 is selected to have sufficient power to change the direction of movement of conductive materials, such as aluminum cans, from their direction of movement along belt 198 to a movement across belt 198 and into weigh hopper 32 (FIG. 1). The motor must have sufficient power to move these materials whether they be in the form of uncrushed cans 400, as illustrated FIG. 11, partially crushed cans 402, as shown in FIG. 12 or axially crushed cans in the form of "hockey pucks" 404 as illustrated in FIG. 13.

Linear induction motors are described with reference both to their power rating and to their duty cycle. Due to the nature of these motors, much heat is generated when in use. Thus, these motors cannot be used continuously, but have a duty cycle, typically in the range of about 25%. As illustrated in FIG. 7, a heat sink 222, comprising an aluminum finned extrusion, and a cooling fan 30 are employed to increase the effective duty cycle of linear induction motor 220. By employing these elements, it is possible to increase the duty cycle of LIM 220 to approximately 50%.

As previously mentioned, while linear induction motor 220 must transport aluminum containers into weigh hopper 32, linear induction motor 220 must not permit exceptionally overweight containers to be accepted. There are numerous controls built into the system of the present invention to tune the system accordingly. Belt 198 is operated at a minimum speed sufficient to transport all material carried by a single cleat 125 of input conveyor 16 past the discharge point of input conveyor 16 prior to delivery to belt 198 of material from the next cleat 125. The speed of belt 198, in conjunction with the power output of linear induction motor 220 and the frictional characteristics of belt 198, determines how quickly and the maximum weight of a piece of material which could be moved across belt 198 by linear induction motor 220. By properly tuning the speed of input conveyor 16, conveyor 18 and the power output of linear induction motor 220 and by properly selecting the belt 198, the system may be fine tuned to accept containers as little as two times the weight of a typical empty aluminum container by rejecting materials over that weight, and maintain an almost 100% collection rate of containers within the prescribed weight range.

All materials which are not moved by linear induction motor 220 into weigh hopper 32 pass over the edge of pully 202 and are collected within a waste container therebeneath.

Figure 8:
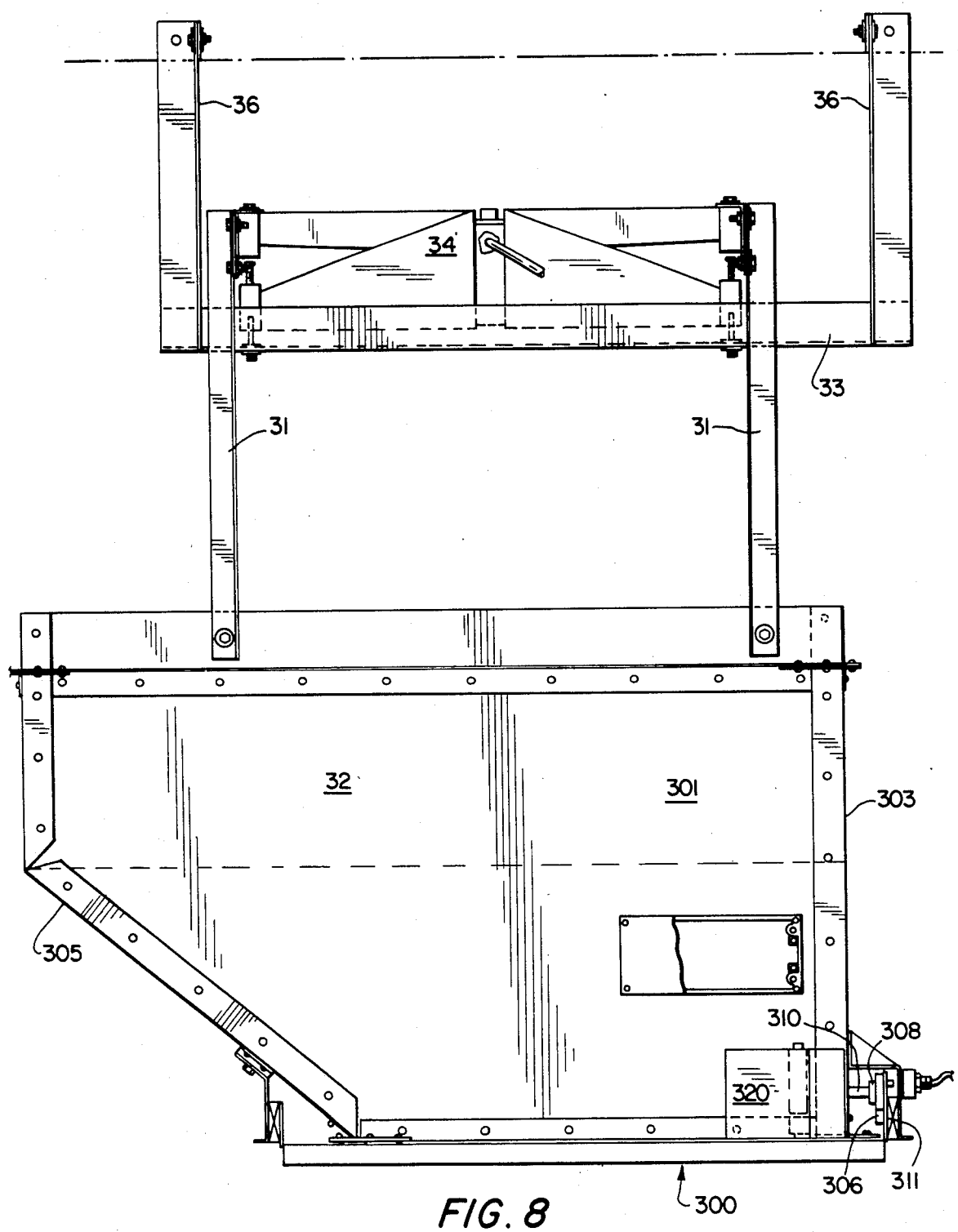
FIG. 8 is a front elevational view of the weighing scale mechanism.
Figure 9:
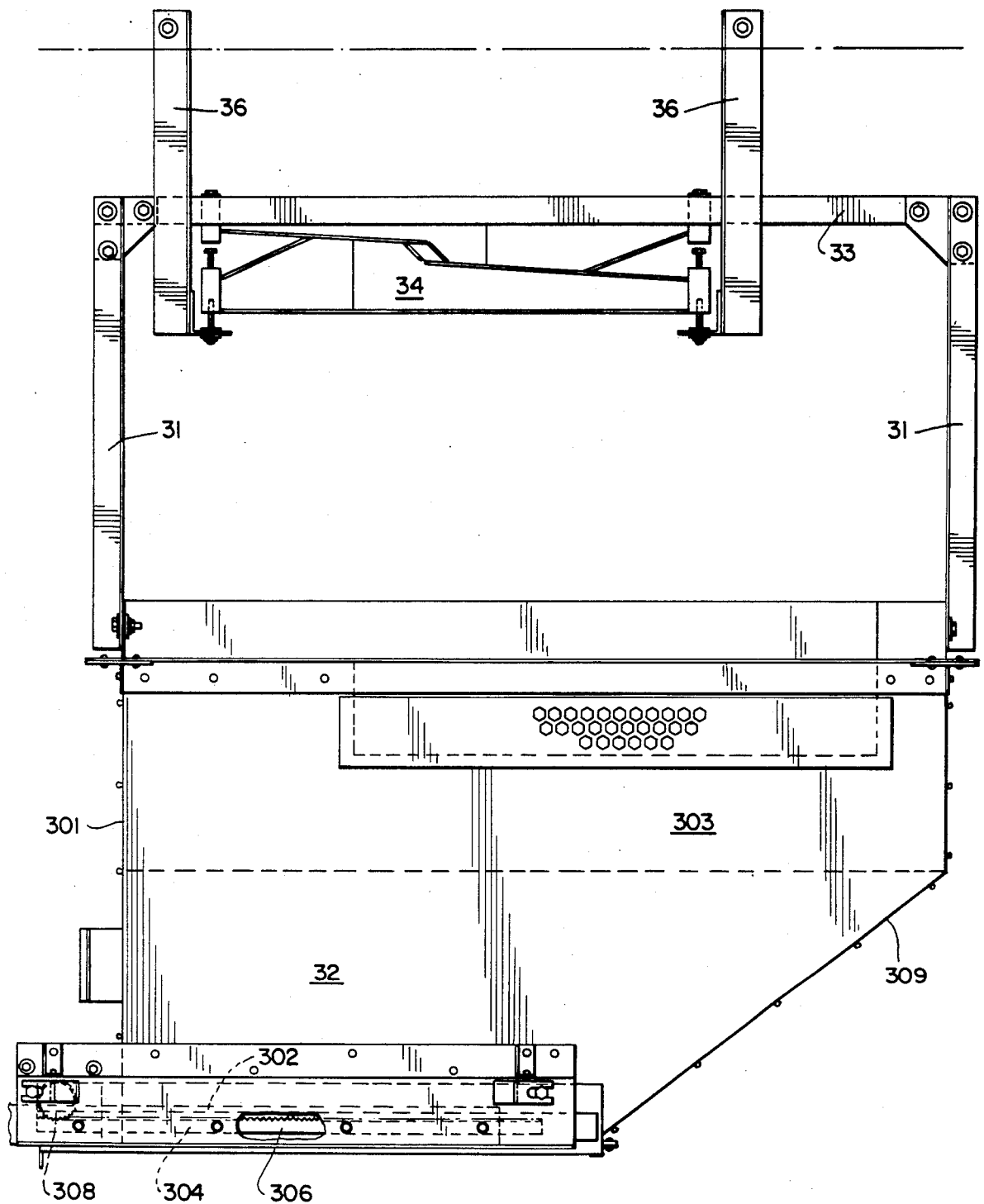
FIG. 9 is a side elevational view of the weighing scale mechanism.
Figure 10:
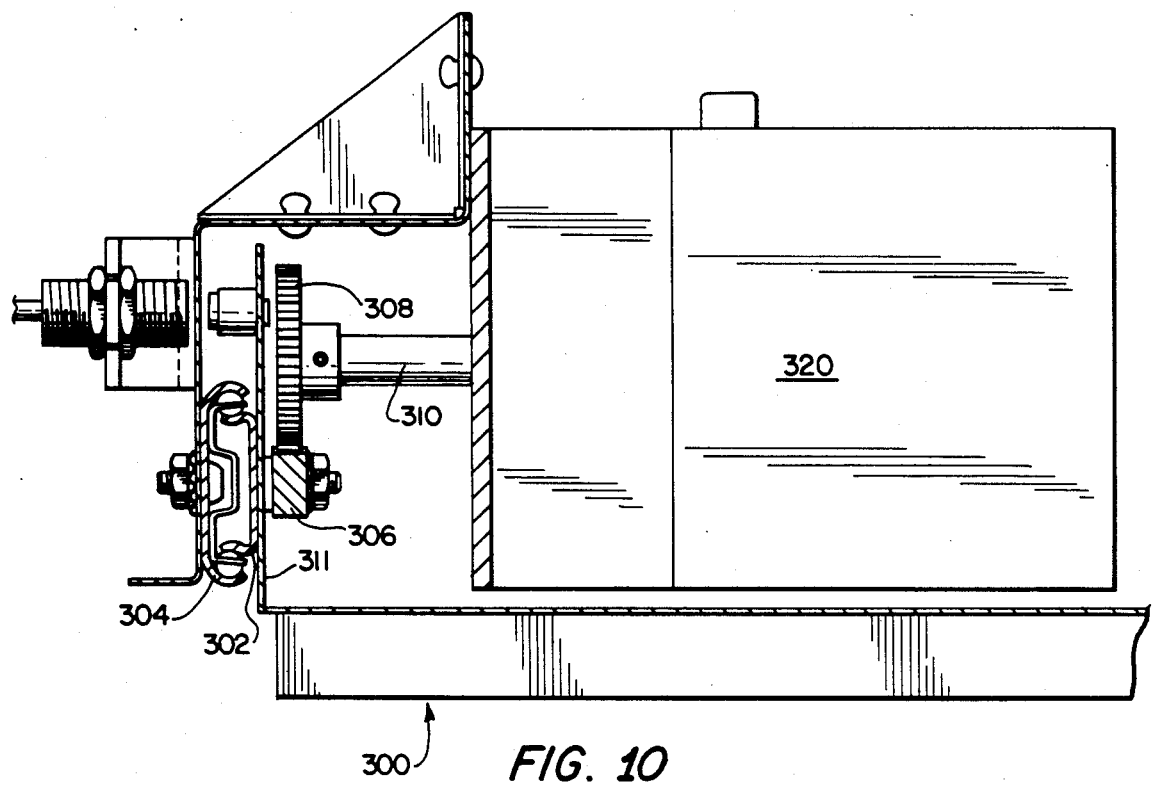
FIG. 10 is a partial cross-sectional view illustrating the connection between the door mechanism and the balance of the weigh scale mechanism.

The weighing mechanism employed in the reverse vending machine of the present invention is illustrated in FIGS. 8, 9 and 10. A weigh hopper 32 is supported by means of rails 31 and 33 from a scale mechanism 34. Scale 34 is in turn hung from the roof of the reverse vending machine by means of rails 36. The weigh hopper 32 comprises a plurality of wall panels 301, 303, 307 and 309 and a bottom door panel 300. As previously explained, if the weigh hopper 32 contains a high density of compacted cans, such as the hockey pucks 404 illustrated in FIG. 13, emptying of the entire load filling weigh hopper 32 may overload crusher 38. Thus, door 300 is mounted for controlled opening as will now be described.

Door 300 is mounted by means of attachment plate 311 to a slide mechanism comprising of inner slide member 304 and an outer slide member 302, similar to slides employed in furniture drawers. Also mounted to attachment plate 311 is a rack 306, which comprises a toothed rail. Pinion 308 mounted upon shaft 310 and connected to a gear motor 320 rotates at a predetermined rate, when given a signal to do so by the control mechanism of the reverse vending machine. The rotation of pinion 308 moves rack 306, due to the toothed engagement therebetween, thereby moving door 300 along slide members 302 and 304.

The rate of opening and closing of door 300 can be controlled by varying the speed of the motor (not shown) driving pinion 308 and/or by the ratio of teeth on the rack and pinion members 306 and 308. Typically, opening and closing rates of between about 30 and 50 inches per minute (76.2 and 127.0 centimeters per minute) and preferably about 40 inches per minute (101.6 centimeters per minute) will enable the crusher 38 to operate satisfactorily by preventing an overabundance of cans at crusher 38.

As illustrated, the system 1 has weigh scale 32 directly above can crusher 38. If, however, for whatever considerations it is necessary to offset weigh scale 32 with respect to crusher 38, an elbow connection therebetween may be employed, and, if necessary, door 300 may be mounted as a bottom part of a sidewall of scale 32.

From the foregoing, it is clear that the method and apparatus of the present invention provides solutions to numerous problems which have been encountered in prior known reverse vending machines.

While the method and apparatus of the present invention have been described with reference to certain specific embodiments thereof, it is not intended to be so limited thereby, except as set forth in the accompanying claims.

We claim:

1. In a method for recycling conductive material from a material input comprising separating magnetic material from said material input and separating said conductive material from the balance of said material input the improvement comprising separating overweight conductive material from said conductive material while maintaining an acceptable level of acceptable weight conductive material recovery by controlling the angle from the horizontal, the height of individual cleats and spacing of adjacent cleats of a cleated input conveyor such that not more than a single row of conductive material is input from a given cleat, positioning an output conveyor perpendicular to and at the exit of said input conveyor and parallel to the axis of said cleats, and controlling the relative speeds of said input conveyor and said output conveyor such that all of said material input from a given cleat of said input conveyor discharged onto said output conveyor passes the discharge point of said input conveyor in a direction perpendicular to its direction of movement along said input conveyor and parallel to the axis of said cleats prior to discharge of said material input from the next of said cleats, thereby controlling the amount of said material input to be separated in a given period of time and controlling the speed and frictional characteristics of said output conveyor and the power input to a linear induction motor positioned beneath said output conveyor, thereby controlling said separating of said conductive material from the balance of said material input.

2. The method of claim 1 wherein said angle ranges between about 55° and 75°.

3. The method of claim 2 wherein said angle is about 65°.

4. The method of claim 1 wherein said cleat height ranges between about 1.5 and 3.0 inches (3.81 and 7.62 centimeters).

5. The method of claim 4 wherein said cleat height is about 2.0 inches (5.08 centimeters).

6. The method of claim 1 wherein said cleat spacing ranges between about 6.0 and 8.0 inches (15.24 and 20.32 centimeters).

7. The method of claim 6 wherein said cleat spacing is about 7.0 inches (17.78 centimeters).

* * * * *